Nov. 22, 1938.   G. M. GRAHAM   2,137,484
CONNECTING ROD ALIGNER
Filed Sept. 4, 1936   2 Sheets-Sheet 1
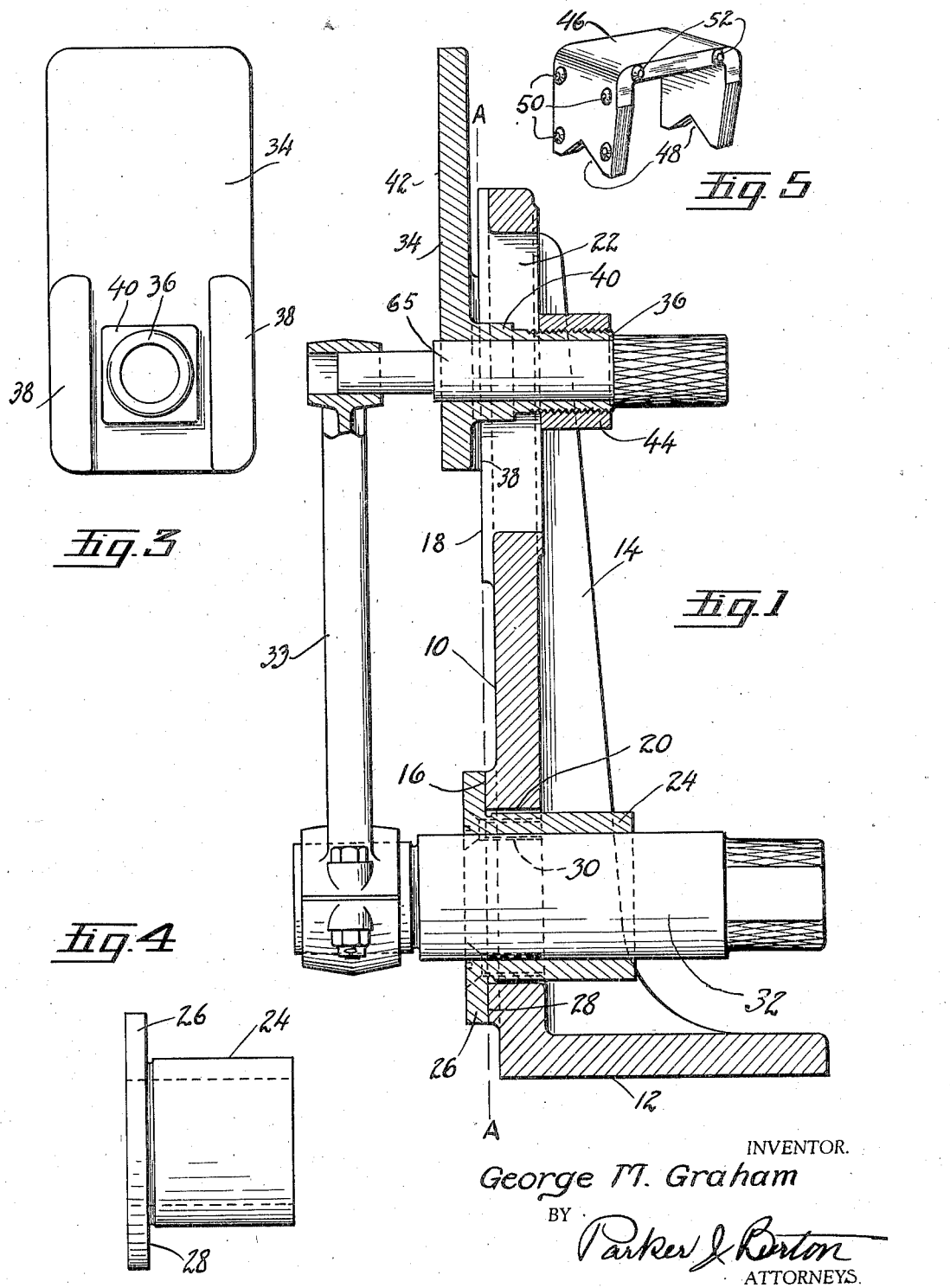
INVENTOR.
George M. Graham
BY
Parker & Burton
ATTORNEYS.

Nov. 22, 1938.                G. M. GRAHAM                2,137,484
                         CONNECTING ROD ALIGNER
                  Filed Sept. 4, 1936        2 Sheets-Sheet 2
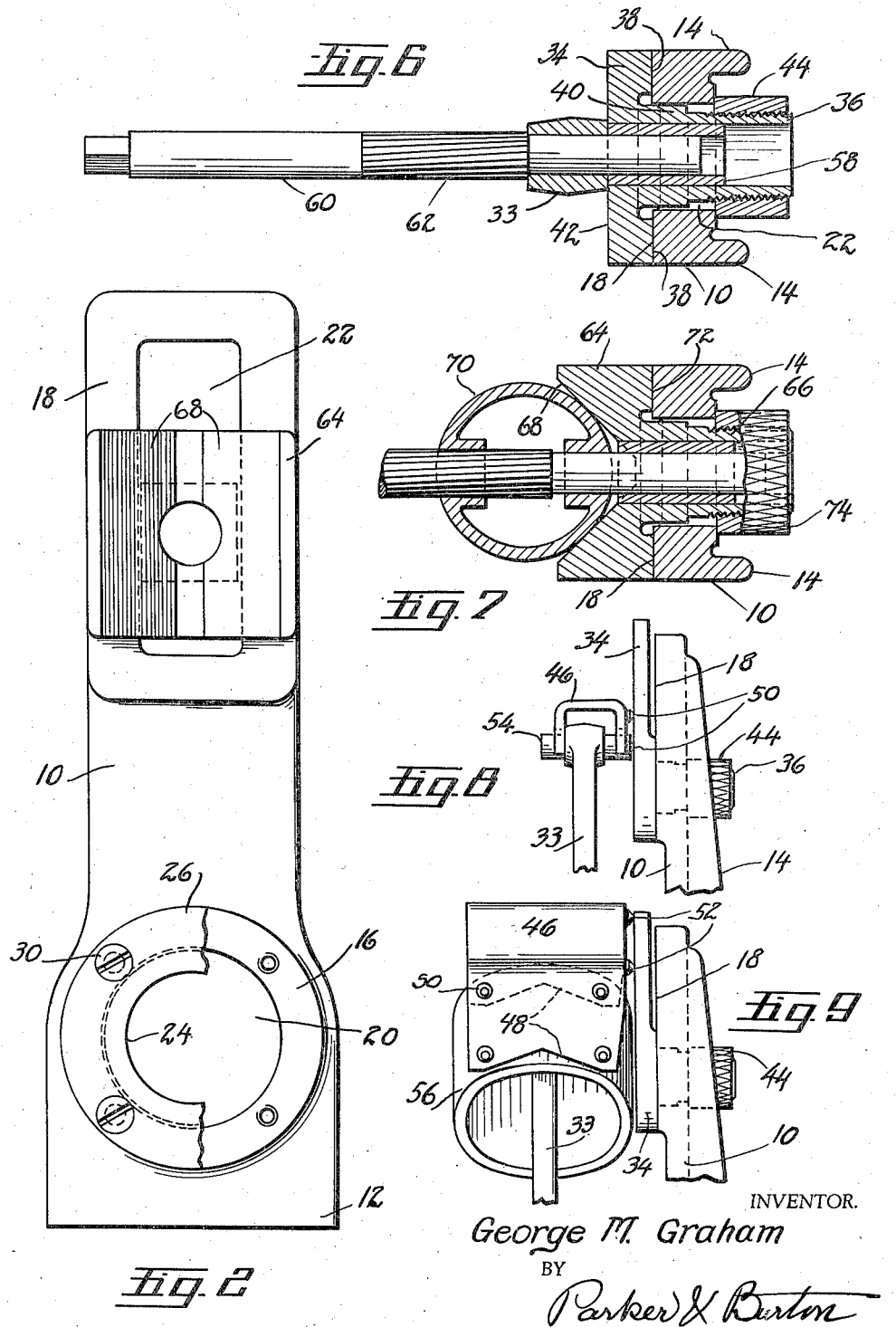
INVENTOR.
George M. Graham
BY
Parker & Burton
ATTORNEYS.

Patented Nov. 22, 1938

2,137,484

UNITED STATES PATENT OFFICE 2,137,484

CONNECTING ROD ALIGNER

George M. Graham, Detroit, Mich., assignor to Hinckley-Myers Company, Jackson, Mich., a corporation of Michigan Application September 4, 1936, Serial No. 99,399

1 Claim. (Cl. 77—62)

This invention relates to aligning devices and more particularly to devices for aligning connecting rods and associated parts of internal combustion engines and to a novel method of making such devices.

In the past considerable difficulty has been encountered in making accurate devices of this character. Since minute measurements ranging in thousandths of inches are required of these devices, it is important that these devices be made accurately yet be of a rugged construction to withstand strong forces and relatively hard usage. The methods pursued in the past in making devices of this character required considerable effort and expense in insuring accuracy of construction.

It has been the custom in making these devices to cast or otherwise form a base frame or support for holding a connecting rod in proper position and to provide instrumentalities, usually integral with the frame, for determining the alignment of the connecting rod thus supported. The frames were usually of relatively large and cumbersome size and it was exceedingly difficult, if not impossible in certain instances to machine or otherwise shape the frame and its parts for precise measurements. A properly constructed aligner of this type must have exact perpendicular and parallel relationships existing between the parts. In the past a variety of machine operations were required to shape the frame into proper alignment and human calculations and measurements were necessary to arrive at this result. The high skill required in the past to make such devices increased the cost while the human factor caused a non-uniform production of these devices.

An important feature of this invention is to provide a device for testing the alignment of connecting rods which is entirely machine made and which is manufactured in such a novel way that extremely accurate and uniform production is insured. Furthermore, the device is simple and rugged in construction and as will appear more fully hereinafter may be adapted for reaming operations in addition to its function as an aligner of connecting rods. More specifically, the invention comprehends a device for aligning connecting rods and parts associated therewith which comprises a plurality of parts separately formed and machined and automatically assuming exactly parallel and perpendicular relationships relative to one another when assembled together.

Exact perpendicular and parallel relationships are automatically incorporated in the device by following the method of construction proposed herein.

In making such a device, a novel method of constructing the various elements and machining for perfect fit is preferably followed. In carrying out this method, a base frame or support is cast and later machine planed along one side to provide spaced flat surface areas extending in the same plane. To the base frame are secured elements which support a connecting rod and measure the alignment thereof. These elements are cast and machined separately to provide bores and flat surfaces extending perpendicularly to one another. These elements of the device are of relatively small size and this enables them to be easily handled and controlled in cutting and shaping machines. An important feature of this method of construction is the fact that while these elements are being machined it is possible to establish the necessary perpendicular relationships entirely by machine and substantially in one operation.

Another object of this invention is to provide an improved device having not only the function of aligning connecting rods and associated parts but also functioning as a support for accurate reaming and cutting operations that may be performed upon a connecting rod. The various parts of the device are constructed in a novel manner to provide this dual function. In the past it has been the custom to provide separate apparatuses for accomplishing these two functions. As a result of this invention, however, aligning and reaming operations can be performed on the same apparatus thus saving in time and labor.

Other objects, advantages and meritorious features will become more apparent from the following specification, appended claims, and accompanying drawings wherein;

Fig. 1 is a cross-sectional view through the middle of the base frame and certain associated elements showing the plane in which the flat surface areas on the frame extend and the manner of supporting a connecting rod by means of the elements attached to the frame, Fig. 2 is an end view of the base frame and certain associated parts with one of the latter broken away to show the interior construction, Fig. 3 is a back view of a testing element or plate showing flat faces thereon which are brought into surface contact with one of the flat surfaces provided on the base frame, Fig. 4 is a side view of a sleeve or bushing element, Fig. 5 is a perspective view of a testing element, Fig. 6 is a top cross-sectional view illustrating the manner of using the device for reaming the wrist pin opening in a connecting rod, Fig. 7 is a top cross-sectional view illustrating the manner of using the device for reaming the wrist pin opening in a piston, Fig. 8 is a detail view showing the manner of testing a connecting rod and a wrist pin associated therewith for alignment, Fig. 9 is a detail view showing the manner of testing a connecting rod and a piston associated therewith for alignment.

Referring more specifically to the drawings, the base frame or support 10 is provided with a bottom 12 for supporting the frame in upright position and spaced vertical reinforcing ribs 14 for rigidifying the frame. The frame is provided on its front face with two flat surfaces 16 and 18 which extend in the same plane as indicated by the line A—A. In place of the two spaced surface areas, one long continuous flat surface may be employed if desired. In Figure 2 the flat surfaces 16 and 18 are more clearly shown as extending around spaced openings or apertures in the frame. One such aperture 20 is circular in formation while the other aperture 22 is rectangular. As will be more clearly understood hereinafter, various different kinds of elements for supporting a connecting rod and measuring the alignment thereof are secured to the frame with parts thereof specially formed for insertion in the apertures of the frame and other parts for abutting engagement with the flat surfaces 16 and 18.

In Figure 4 one such element is shown. This element is intended to form a part of the means for supporting a connecting rod upon the frame. This element is in the form of a sleeve 24 having an annular flange 26. The sleeve is of such a size that it easily fits through the aperture 20 provided in the frame as shown in Figures 1 and 2. The bore of the sleeve is machine finished and at the same time this is done it is desirable to machine finish the back side of the flange 26 to provide a face 28 which extends exactly perpendicular to the axis of the bore. When the sleeve is into the opening 20, the face 28 contactingly engages the flat surface 16 surrounding the opening and adjusts the sleeve relative to the frame so that the axis of the bore extends exactly perpendicular to the plane A—A. The sleeve may be secured to the frame in this position by any suitable means such as by the provision of screws 30 threaded through the flange 26 as shown in Figure 2.

When the sleeve is secured to the frame it is adapted to support a shaft or arbor 32 having sections of different diameters. One section is of a diameter which tightly yet slidably fits in the bore of the sleeve and this insures that the axis of the arbor is subtended exactly perpendicular to the plane A—A. The arbors are constructed in various diameters for the purpose of supporting connecting rods 33 of various sizes. The arbor shown in Fig. 1 has longitudinal portions of different diameter. Two such portions are here shown though obviously the arbor might be formed to provide more than two such portions. One end of the arbor may be knurled as shown to assist the operator in slidably adjusting the arbor in the sleeve.

Another element which is removably secured to the frame in a manner similar to the sleeve 24 is shown in Figure 3. It is in the form of a plate 34 having a bored, exteriorly threaded shank 36 extending from one side of the plate. On either side of the base of the shank are flat faces 38 extending exactly perpendicular to the axis of the bore in the shaft. This perpendicular relationship can be established, as will be explained more fully hereinafter, by boring the shank and finishing the faces in substantially the same operation while on a shaping machine. The shank 36 is of a size to fit through the rectangular opening 22. It is squared at 40 to ride in the opening while preventing the plate from turning relative to the frame. The front face 42 of the plate is machined planed parallel to the faces 38 and this disposes the front face in parallel alignment with the plane A—A when the plate is assembled upon the frame with the faces 38 contactually engaging the flat surface 18. A nut 44 is threaded upon the shank and tightens the plate in any desirable position along the rectangular opening 22.

The elements thus far described constitute the parts which when assembled on the base frame are adapted to test the alignment of the connecting rod and associated wrist pin and piston. As will be more fully described hereinafter, these elements are also adapted to form supporting members for reaming operations performed upon connecting rods.

In Figures 8 and 9 I have illustrated the manner in which the device thus far described may be used for testing the alignment of a connecting rod and associated parts. In both views it is understood that the crank pin end of the connecting rod is supported upon the arbor 32 in the manner shown in Figure 1. This disposes the wrist pin end of the connecting rod opposite the front face of the plate 34.

To test the alignment of a connecting rod with either the wrist pin or piston assembled thereon, a combination testing element shown in Figure 5 may be used. This element 46 is constructed out of a metal strip and bent in the general shape of a U. The outer edges of the arms of the U are grooved as at 48. Along one side of an arm a plurality of spaced pins or nibs 50 are provided. A pair of such nibs 52 are provided along one edge of the base of the U as shown.

In Figure 8 the position assumed by the testing element 46 for measuring the alignment of a wrist pin 54 on a connecting rod is shown. The element straddles the end of the connecting rod while the grooves 48 partially embrace the wrist pin 54. Proper alignment is indicated when all the nibs 50 contact the front face of the plate 34. If improper alignment is shown the connecting rod may be twisted by tools customarily used for this purpose until four point contact is made by the nibs 50.

In Figure 9, the grooves 48 on the testing element partially fit about the wall of a piston 56 carried by a connecting rod. In this case proper alignment is indicated when the two nibs 52 together contact the front face of the plate 34.

Figure 6 illustrates how the device may be used for cutting or reaming operations upon connecting rod 33. As previously explained, the shank 36 of the plate 34 is provided with a bore. When reaming operations are conducted this bore may support a reamer guide 58 which is in the form of a sleeve slidably received in the bore of the shank. This sleeve is adapted to support the front end of a reamer or other cutting tool 60 as shown in Figure 6. The guide acts to direct the reamer through the wrist pin opening in a direction exactly perpendicular to the plane A—A. The interior diameter of the guide is preferably of less diameter than the cutting section 62 of the reamer so that when the cutting section passes through the wrist pin opening it picks up the guide and carries it through the bore of the shank.

Before the wrist pin opening or the bearing therein is cut to size by a reamer or other suitable tool, it is desirable to align the wrist pin opening exactly opposite the bore of the shank 36. This is accomplished by a presetting tool 65 which is inserted through the shank in a direction opposite to that of a cutting tool. The presetting operation is depicted in Figure 1. The tool 65 preferably has a diameter at one part which slidably fits the bore of the shank and another part of less diameter which fits the wrist pin opening of a connecting rod. The reamer guide 58 is removed when a presetting tool of the type shown in Figure 1 is employed.

In Figure 7 I have illustrated another element 64 which may be secured to the base frame in a manner similar to plate 34. This element is likewise provided with a tubular shank 66 similar in construction to shank 36 in which a reamer guide may slide. Element 64 is particularly adaptable for supporting a piston while the same is reamed. A V-groove 68 is formed on the front face of the element into which a piston 70 may be wedged as shown in Figure 7. The opposite side of the element is provided with flat faces 72 similar in function to the flat faces 38 on the plate 34. These faces are brought into surface contact with the flat surface 18 surrounding the rectangular opening 22. A nut 74 is adapted to tighten the element 64 against the front of the frame. A front view of this element is shown in Figure 2.

The piston is preferably reamed while separate from the connecting rod. As the reamer passes through the piston from left to right in Figure 7 it continuously exerts a pressure on the piston tending to urge it further into the V-groove on the element 64. The vertical extent of the V-groove keeps the piston from moving or turning as the reaming operation continues. The reamer is sufficient to support the piston in the V-groove and the slidable reamer guide in the bore of the shank 66 maintains the reamer in proper alignment throughout the operation.

Having now described the structural features of the invention I shall now describe the preferred way of making the base frame and the elements associated therewith. As previously pointed out, this method positively and automatically insures parallel and perpendicular alignment of the parts relative to one another. First, the base frame is cast in the form shown in Figures 1 and 2. The front face of this casting is machine planed along the line A—A in one operation. This forms flat surfaces 16 and 18 extending in the same plane. The openings 20 and 22 have of course been cast in the frame but whether they extend perpendicular to the flat surfaces is of little consequence and they may be left in the manner they were cast. This is contrary to previous methods of making such devices wherein it was necessary to make the supporting parts of the device, whether openings or shafts, extend exactly perpendicular or parallel to one another as the case may be.

The various elements which may be assembled on the base frame are cast or otherwise formed and then easily machine finished. The sizes of these elements are small and relatively symmetrical in formation and they can be machined without difficulty. It is possible to machine finish the respective bores and faces of each element in one operation. For example, the sleeve shown in Figure 4 may be cast and then supported upon a cutting machine having tools which finish the wall of the bore and finish the face 28 without removing the sleeve from the machine. Accordingly it is possible to machine the bore and face in exactly perpendicular relationship. When the sleeve is assembled on the frame with the flat faces thereof contacting one another, the axis of the bore will extend perpendicularly to the plane A—A.

Likewise the plate 34 can be cut and finished in the same machine and in such a way that the cutting appliances finish the faces 38 in a plane at right angles to the axis of the bore in the shank. The front face 42 may be machine planed either before or after the faces 38 are finished. In either case exact parallel relationship can easily be established between these faces in cutting and shaping machines. The method described in connection with the sleeve 24 and the plate 34 is likewise applicable to the manufacture of any other element which is to be mounted on the frame in a predetermined angular relationship.

What I claim is:

A device for aligning connecting rods comprising, in combination, a base frame having a flat surface and an opening in the frame extending substantially perpendicularly to the plane of said surface, means on said frame for supporting a connecting rod with an end thereof disposed opposite said flat surface, a cutting tool having a cutting portion and a shank of reduced diameter, an element having a part thereof insertable in the opening of said frame for securement thereto and provided with a flat face contactingly engageable with the flat surface on said frame to adjust the element in proper position, said element having a bore therein extending into said part, and having a diameter oversize that of the cutting portion of said tool, and a sleeve slidably fitted in said bore and arranged to supportingly receive and guide the shank of said cutting tool while it is operated upon a connecting rod supported by said frame, said sleeve being capable of advancing along with said cutting tool as it is operated so that clearance is provided between the wall of the bore and the cutting portion of the tool as the latter advances through the bore.

GEORGE M. GRAHAM.